US012586364B2

(12) United States Patent (10) Patent No.: US 12,586,364 B2
Motiian et al. (45) Date of Patent: Mar. 24, 2026

(54) SINGLE IMAGE CONCEPT ENCODER FOR PERSONALIZATION USING A PRETRAINED DIFFUSION MODEL

(71) Applicant: ADOBE INC., San Jose, CA (US)

(72) Inventors: Saeid Motiian, San Francisco, CA (US); Shabnam Ghadar, Menlo Park, CA (US)

(73) Assignee: ADOBE INC., San Jose, CA (US)

( * ) Notice: Subject to any disclaimer, the term of this patent is extended or adjusted under 35 U.S.C. 154(b) by 324 days.

(21) Appl. No.: 18/053,450

(22) Filed: Nov. 8, 2022

(65) Prior Publication Data

US 2024/0153259 A1     May 9, 2024

(51) Int. Cl.
*G06V 10/82* (2022.01)
*G06V 10/75* (2022.01)
*G06V 10/771* (2022.01)

(52) U.S. Cl.
CPC ............ *G06V 10/82* (2022.01); *G06V 10/751* (2022.01); *G06V 10/771* (2022.01)

(58) Field of Classification Search
CPC .... G06V 10/82; G06V 10/751; G06V 10/771; G06N 3/0464; G06N 3/08; G06T 11/001; G06T 2207/20081; G06T 2207/20084
See application file for complete search history.

(56) References Cited

U.S. PATENT DOCUMENTS

| | | | |
|---|---|---|---|
| 11,113,578 B1 | 9/2021 | Brandt et al. | |
| 2020/0342652 A1* | 10/2020 | Rowell | G06V 10/82 |
| 2021/0110588 A1* | 4/2021 | Adamson, III | G06T 11/60 |
| 2022/0108417 A1* | 4/2022 | Liu | G06T 1/0007 |
| 2022/0156987 A1 | 5/2022 | Chandran et al. | |
| 2022/0245322 A1* | 8/2022 | Lundin | G06T 11/60 |
| 2023/0289952 A1* | 9/2023 | Soborski | G06T 7/0008 |

FOREIGN PATENT DOCUMENTS

| | | |
|---|---|---|
| CN | 106952224 B | 8/2019 |
| CN | 114880441 A | 8/2022 |
| CN | 115222583 A | 10/2022 |

(Continued)

OTHER PUBLICATIONS

Gu, Shuyang, et al. "Vector Quantized Diffusion Model for Text-to-Image Synthesis." 2022 IEEE/CVF Conference on Computer Vision and Pattern Recognition (CVPR). IEEE, 2022.https://ieeexplore. ieee.org/abstract/document/9879180 (Year: 2022).*

(Continued)

*Primary Examiner* — Han Hoang
(74) *Attorney, Agent, or Firm* — F. CHAU & ASSOCIATES, LLC

(57)     ABSTRACT

Systems and methods for image processing are provided. One aspect of the systems and methods includes identifying a style image including a target style. A style encoder network generates a style vector representing the target style based on the style image. The style encoder can be trained based on a style loss that encourages the network to match a desired style. A a diffusion model generates a synthetic image that includes the target style based on the style vector. The diffusion model is trained independently of the style encoder network.

19 Claims, 13 Drawing Sheets

(56)          References Cited

FOREIGN PATENT DOCUMENTS

CN          115272121  A      11/2022

OTHER PUBLICATIONS

Hertz, Amir, et al. "Prompt-to-prompt image editing with cross attention control." arXiv preprint arXiv:2208.01626 (2022).https://arxiv.org/abs/2208.01626 (Year: 2022).*

Combined Search and Examination Report dated Feb. 22, 2024 in related Great Britain Patent Application No. GB2313666.6, 6 pages.

1Gal, et al, "An Image is Worth One Word: Personalizing Text-to-Image Generation using Textual Inversion", arXiv preprint arXiv:2208.01618v1 [cs.CV] Aug. 2, 2022, 26 pages.

* cited by examiner

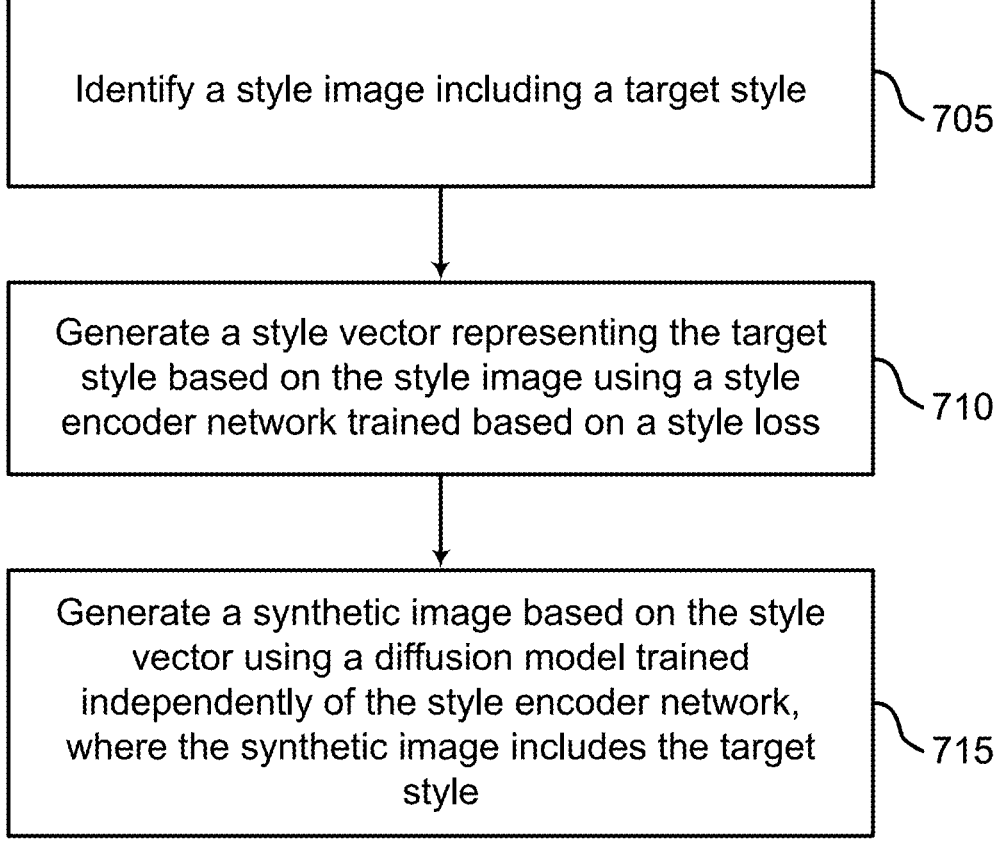

Identify a style image including a target style  ⟩ 705

Generate a style vector representing the target style based on the style image using a style encoder network trained based on a style loss  ⟩ 710

Generate a synthetic image based on the style vector using a diffusion model trained independently of the style encoder network, where the synthetic image includes the target style  ⟩ 715

FIG. 7

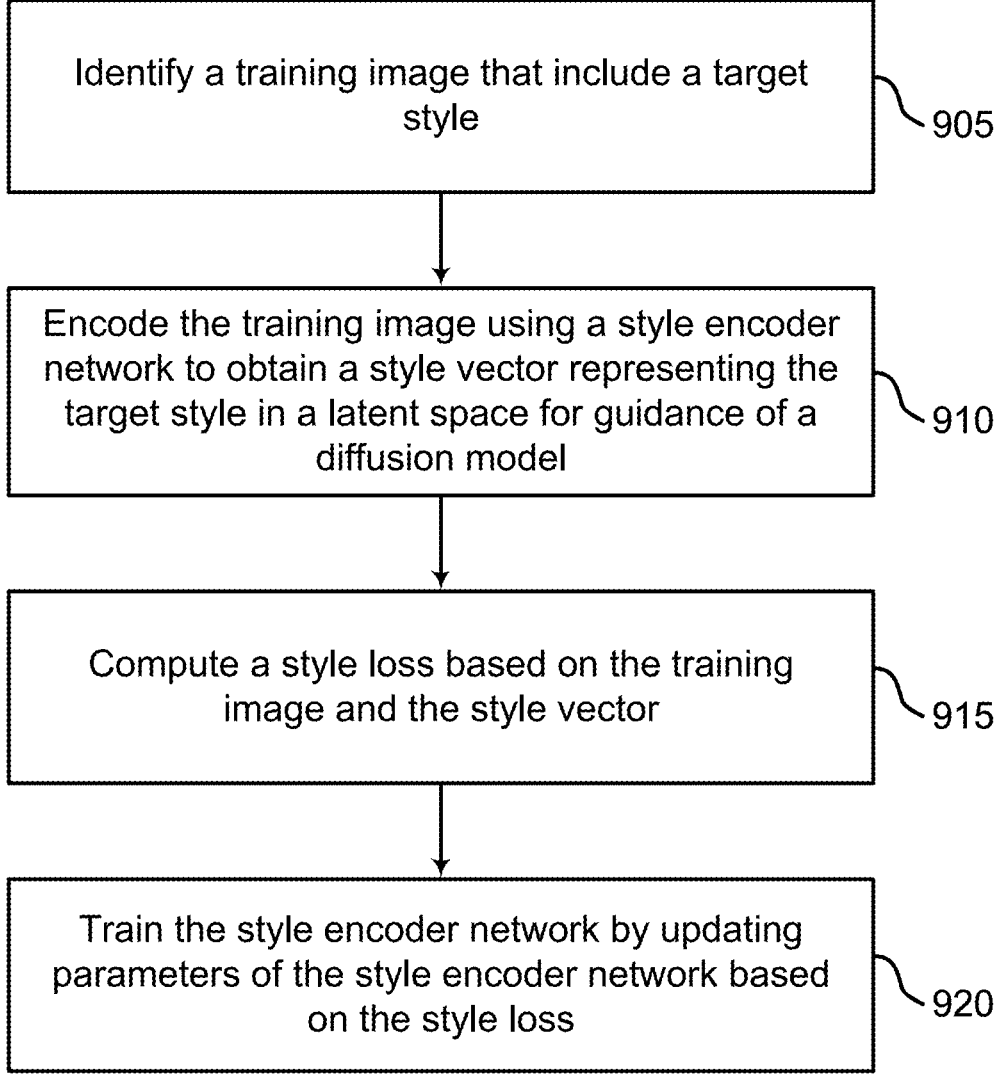

Identify a training image that include a target style ⟍905

Encode the training image using a style encoder network to obtain a style vector representing the target style in a latent space for guidance of a diffusion model ⟍910

Compute a style loss based on the training image and the style vector ⟍915

Train the style encoder network by updating parameters of the style encoder network based on the style loss ⟍920

FIG. 9

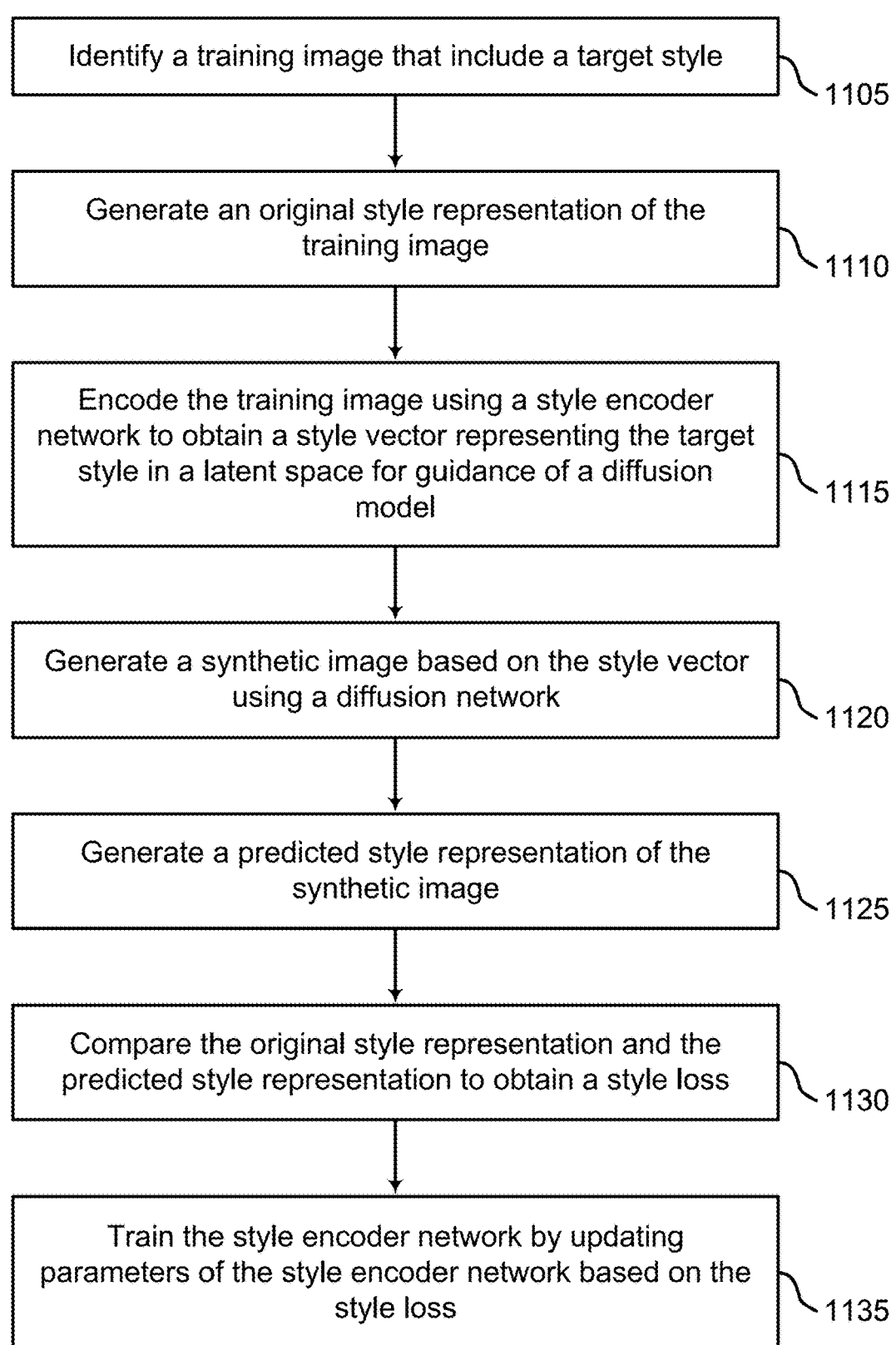

Identify a training image that include a target style

1105

Generate an original style representation of the training image

1110

Encode the training image using a style encoder network to obtain a style vector representing the target style in a latent space for guidance of a diffusion model

1115

Generate a synthetic image based on the style vector using a diffusion network

1120

Generate a predicted style representation of the synthetic image

1125

Compare the original style representation and the predicted style representation to obtain a style loss

1130

Train the style encoder network by updating parameters of the style encoder network based on the style loss

Initialize untrained model — 1205

Add noise to training image using forward diffusion process in N stages — 1210

At each stage n, starting with stage N, predict image for stage n - 1 — 1215

Compare predicted image at stage n − 1 to actual image at stage n - 1 — 1220

Update parameters of the model based on the comparison — 1225

1200

Figure 13:
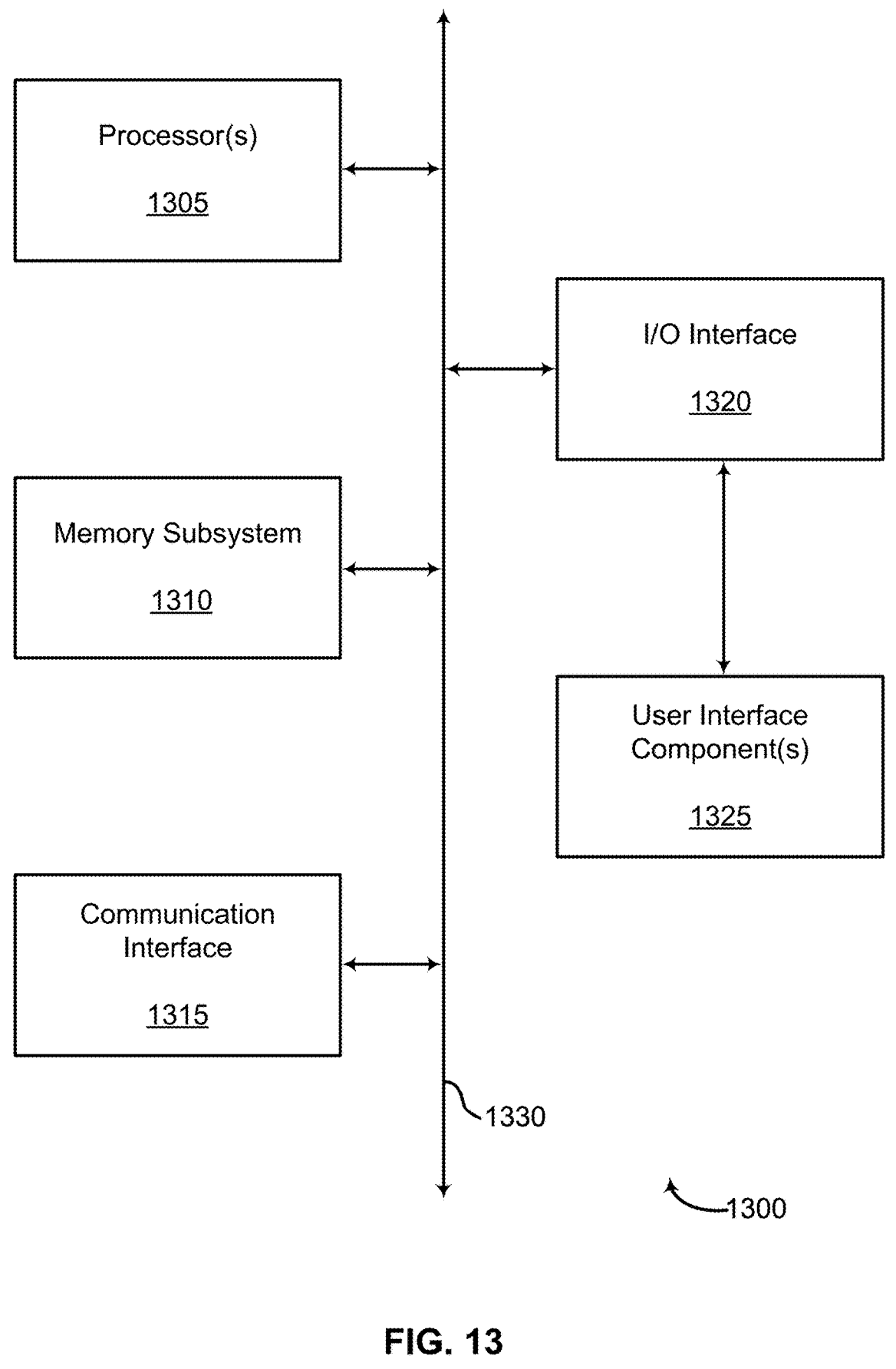

Processor(s)

1305

I/O Interface

1320

Memory Subsystem

1310

User Interface
Component(s)

1325

Communication
Interface

SINGLE IMAGE CONCEPT ENCODER FOR PERSONALIZATION USING A PRETRAINED DIFFUSION MODEL

BACKGROUND

The following relates generally to machine learning, and more specifically to machine learning for image processing.

Digital image processing generally refers to the use of a computer to edit a digital image (e.g., using an algorithm, a processing network, etc.). In some cases, image processing software may be used for various image processing tasks, such as image editing, image generation, etc. Some image processing systems may implement machine learning techniques, for example, to perform tasks using predictive models (e.g., without explicitly programing the system for each task), to perform tasks with more accuracy or in less time, to perform tasks using special-purpose hardware, etc.

Image generation (a subfield of digital image processing) may include using a machine learning model to generate images. Diffusion models are a category of machine learning model that generates images based on stochastic processes. Specifically, diffusion models introduce random noise at multiple levels and train a network to remove the noise.

SUMMARY

The present disclosure describes systems and methods for image processing. Embodiments of the present disclosure include an image processing apparatus configured to generate images that have a target style. The image processing apparatus may train a style encoder to generate style vectors in a latent space for guidance of a diffusion model. In some examples, the style encoder may be trained using either pre-optimized style vectors or by comparing the style of a predicted image to that of the input to the style encoder. Once the style encoder is trained, the style encoder may be used to generate a style vector based on a style image. The style vector may be input to a diffusion model, and the diffusion model may generate an image based on the style vector. This way, users can easily and accurately specify styles using style images to guide a diffusion model to generate desired images.

A method, apparatus, non-transitory computer readable medium, and system for machine learning for image processing are described. One or more aspects of the method, apparatus, non-transitory computer readable medium, and system include identifying a style image including a target style; generating a style vector representing the target style based on the style image using a style encoder network trained based on a style loss; and generating a synthetic image based on the style vector using a diffusion model trained independently of the style encoder network, wherein the synthetic image includes the target style.

A method, apparatus, non-transitory computer readable medium, and system for machine learning for image processing are described. One or more aspects of the method, apparatus, non-transitory computer readable medium, and system include identifying a training image that includes a target style; encoding the training image using a style encoder network to obtain a style vector representing the target style in a latent space for guidance of a diffusion model; computing a style loss based on the training image and the style vector; and training the style encoder network by updating parameters of the style encoder network based on the style loss.

An apparatus, system, and method for machine learning for image processing are described. One or more aspects of the apparatus, system, and method include a processor; a memory including instructions executable by the processor to: identifying a style image including a target style; generating a style vector representing the target style based on the style image using a style encoder network trained based on a style loss; and generating a synthetic image based on the style vector using a diffusion model trained independently of the style encoder network, wherein the synthetic image includes the target style.

BRIEF DESCRIPTION OF THE DRAWINGS

FIG. 7 shows an example of a method for machine learning according to aspects of the present disclosure.

FIGS. 9 through 11 show examples of methods for machine learning according to aspects of the present disclosure.

FIG. 13 shows an example of a computing device for image processing according to aspects of the present disclosure.

DETAILED DESCRIPTION

Figure 1:
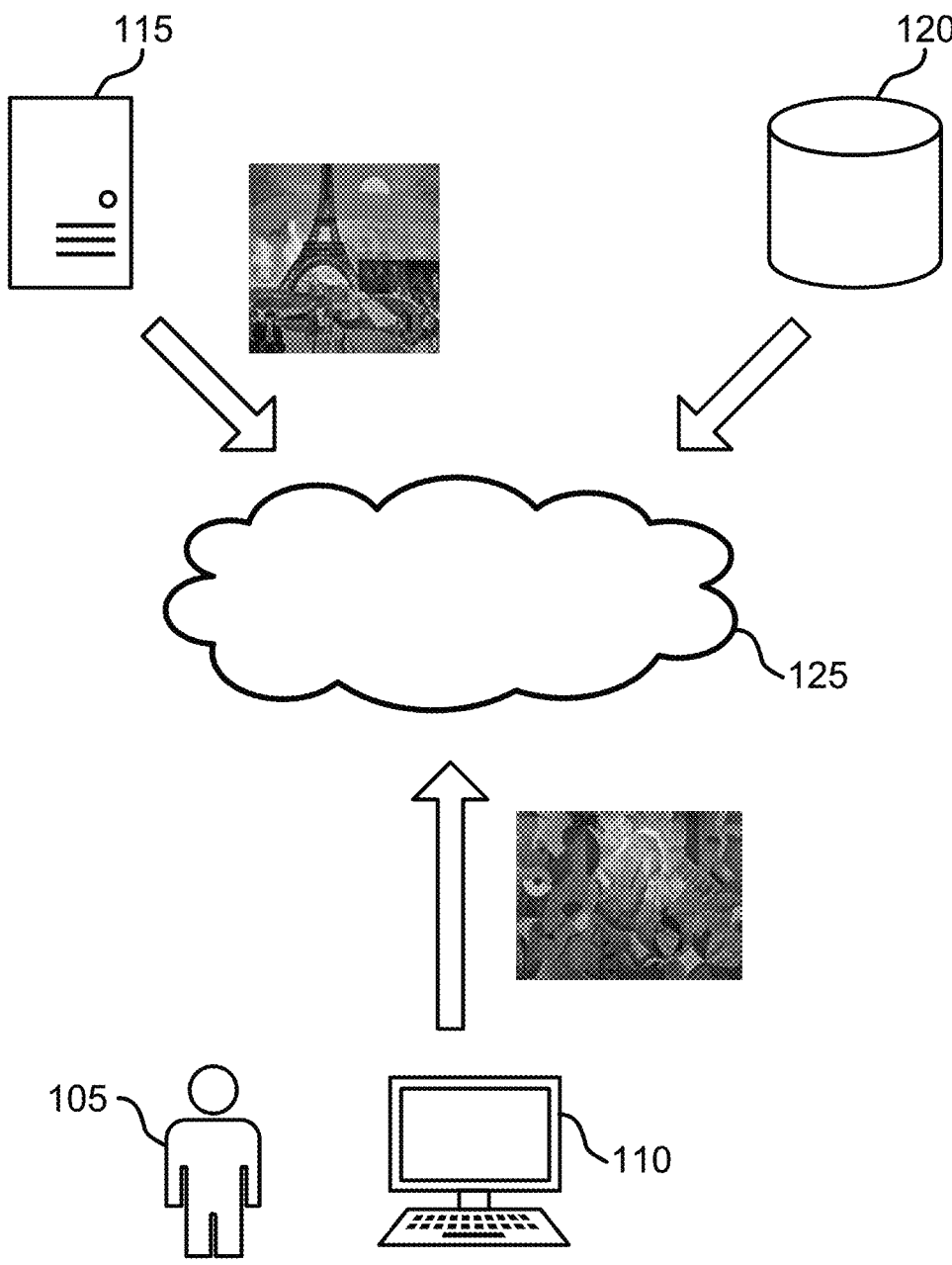
FIG. 1 shows an example of an image processing system according to aspects of the present disclosure.

The present disclosure describes systems and methods for image processing. Embodiments of the present disclosure include an image processing apparatus configured to generate images that have a target style. The image processing apparatus may train a style encoder to generate style vectors in a latent space for guidance of a diffusion model. In some examples, the style encoder may be trained using either pre-optimized style vectors or by comparing the style of a predicted image to that of the input to the style encoder. Once the style encoder is trained, the style encoder may be used to generate a style vector based on a style image. The style vector may be input to a diffusion model, and the diffusion model may generate an image based on the style vector. This way, users can easily and accurately specify styles using style images to guide a diffusion model to generate desired images.

Diffusion-based generation models may be used for conditional image generation. A diffusion-based generation model may generate an image based on one or more conditions specified by a user. The one or more conditions may correspond to image features in a latent space that may guide the diffusion model to generate an image with the image features. In some examples, the one or more conditions may be specified by a user using natural language text. The natural language text may be tokenized and mapped to one or more vectors in the latent space of the diffusion model. In some cases, however, it may be challenging to find an appropriate word to describe a desired style for an image. In such cases, a diffusion model may be unable to generate an image with the desired style.

Embodiments of the present disclosure include an image processing apparatus configured to generate a style vector representing a target style based on a style image. After generating the style vector, the image processing apparatus may generate a synthetic image based on the style vector. The style vector may correspond to an embedding in the latent space of a diffusion model rather than a word or natural language text. Thus, the style vector may guide the diffusion model to generate an image with the desired style. In some examples, the style image may be specified by a user along with other conditions for generating the image (e.g., included in a text prompt). The image processing apparatus may include a style encoder used to generate style vectors based on style images (e.g., in real time). Additionally, or alternatively, the image processing apparatus may include one or more other encoders (e.g., layout encoders, audio encoders, depth information encoders) that may generate vectors or embeddings corresponding to one or more other conditions to guide a diffusion model.

According to some embodiments, an image processing apparatus may train a style encoder to generate style vectors based on style images. During training, a training component may compute a style loss and may update parameters of the style encoder based on the style loss. In some examples, the image processing apparatus may train the style encoder using pre-optimized style vectors. In such examples, the training data may include pairs of training images and pre-optimized style vectors. For each training image, a training component may generate a style vector and may compute a style loss by comparing the generated style vector to a respective pre-optimized style vector. In other examples, the image processing apparatus may train the style encoder by comparing the style of a predicted image to that of the input to the style encoder. In such examples, the training data may include images. For each training image, a training component may generate a style vector and generate an image based on the style vector. The training component may then compute a style loss by comparing the generated image to the training image.

Because the image processing apparatus may take a style image as input, a user may be able to easily specify a desired style to guide a diffusion model to generate an image with the desired style. Further, because the image processing apparatus may generate a style vector based on a style image, the style vector may correspond to an embedding in a latent space of a diffusion model that may not correspond to a word. That is, the style vector generated by the image processing apparatus may not map to natural language text. Thus, the style vector generated by the image processing apparatus may specify a desired style for an image more accurately than any user. Details regarding the architecture of an example image processing apparatus are provided with reference to FIGS. 1-5. Example processes for image processing are provided with reference to FIGS. 6-8. Example training processes are described with reference to FIGS. 9-12.

Accordingly, embodiments of the present disclosure enable users to generate images that incorporate a desired style. Embodiments are able to generate these images without retraining the image generation network. This can result in reduced training time and increased efficiency. Further-more, in some embodiments, a single image can be used to generate a style vector representing a target style rather than using multiple images representing the style. This makes it easier for users to create an output with a desired style without collecting many training examples.

Network Architecture

FIG. 1 shows an example of an image processing system 100 according to aspects of the present disclosure. The image processing system 100 includes user 105, computing device 110, image processing apparatus 115, database 120, and cloud 125. The image processing apparatus 115 is an example of, or includes aspects of, the corresponding element described with reference to FIG. 2.

According to FIG. 1, a user 105 may interact with image generation software on user device 110. The user device 110 may communicate with an image processing apparatus 115, which may be located on the cloud 125. In some examples, the user 105 may provide a style image to the image processing apparatus 115 via the user device 110, and the image processing apparatus 115 may generate a synthetic image that includes a same or similar style as the style image. The image processing apparatus 115 may then provide the synthetic image to the user device 110 for the user.

In some examples, the image processing apparatus 115 may include a server. A server provides one or more functions to users 105 linked by way of one or more of the various networks. In some cases, the server includes a single microprocessor board, which includes a microprocessor responsible for controlling all aspects of the server. In some cases, a server uses microprocessor and protocols to exchange data with other devices/users 105 on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device 110, a personal computer, a laptop computer, a mainframe computer, a super computer, or any other suitable processing apparatus.

A database 120 is an organized collection of data. For example, a database 120 stores data in a specified format known as a schema. A database 120 may be structured as a single database 120, a distributed database 120, multiple distributed databases 120, or an emergency backup database 120. In some cases, a database 120 controller may manage data storage and processing in a database 120. In some cases, a user 105 interacts with database 120 controller. In other cases, database 120 controller may operate automatically without user 105 interaction.

A cloud 125 is a computer network configured to provide on-demand availability of computer system resources, such as data storage and computing power. In some examples, the cloud 125 provides resources without active management by the user 105. The term cloud 125 is sometimes used to describe data centers available to many users 105 over the Internet. Some large cloud 125 networks have functions distributed over multiple locations from central servers. A server is designated an edge server if it has a direct or close connection to a user 105. In some cases, a cloud 125 is limited to a single organization. In other examples, the cloud 125 is available to many organizations. In one example, a cloud 125 includes a multi-layer communications network comprising multiple edge routers and core routers. In another example, a cloud 125 is based on a local collection of switches in a single physical location.

A computing device 110 is a personal computer, laptop computer, mainframe computer, palmtop computer, personal assistant, mobile device, or any other suitable processing apparatus. In one aspect, image processing system 100 includes user 105, computing device 110, image processing apparatus 115, database 120, and cloud 125. Image processing apparatus 115 is an example of, or includes aspects of, the corresponding element described with reference to FIG. 2.

Figure 2:
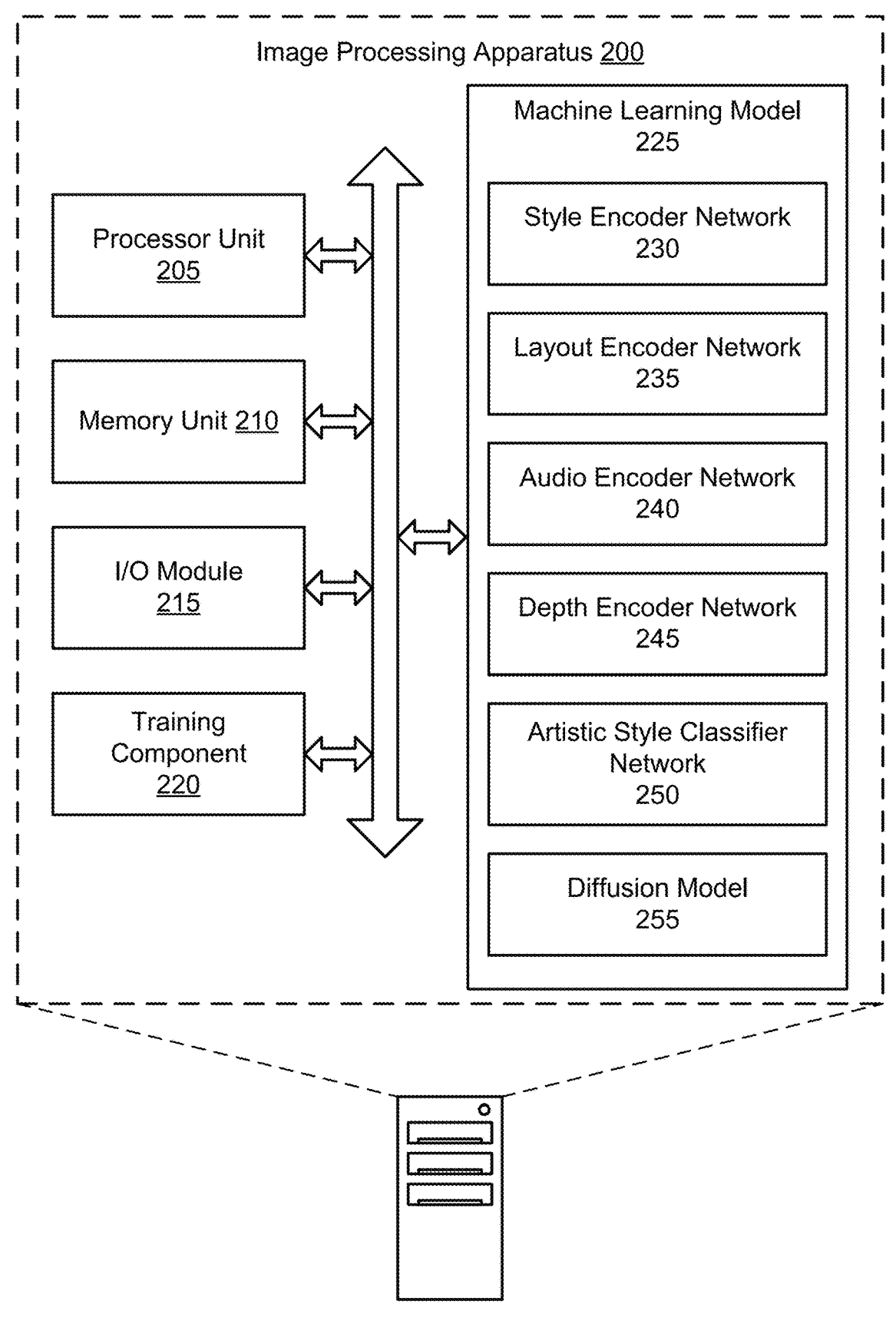
FIG. 2 shows an example of an image processing apparatus according to aspects of the present disclosure.

FIG. 2 shows an example of an image processing apparatus 200 according to aspects of the present disclosure. The example shown includes image processing apparatus 200, processor unit 205, memory unit 210, I/O module 215, training component 220, and machine learning model 225. The machine learning model 225 includes style encoder network 230, layout encoder network 235, audio encoder network 240, depth encoder network 245, artistic style classifier network 250, and diffusion model 255. Image processing apparatus 200 is an example of, or includes aspects of, the corresponding element described with reference to FIG. 1.

Processor unit 205 comprises a processor. Processor unit 205 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 205 is configured to operate a memory array using a memory controller. In other cases, a memory controller is integrated into the processor unit 205. In some cases, the processor unit 205 is configured to execute computer-readable instructions stored in a memory to perform various functions. In some embodiments, a processor unit 205 includes special purpose components for modem processing, baseband processing, digital signal processing, or transmission processing.

Memory unit 210 comprises a memory including instructions executable by the processor. Examples of a memory unit 210 include random access memory (RAM), read-only memory (ROM), or a hard disk. Examples of memory units 210 include solid state memory and a hard disk drive. In some examples, memory is used to store computer-readable, computer-executable software including instructions that, when executed, cause a processor to perform various functions described herein. In some cases, the memory unit 210 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 210 store information in the form of a logical state.

I/O module 215 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an I/O controller.

In some examples, I/O module 215 includes a user interface. A user interface may enable a user to interact with a device. In some embodiments, the user interface may include an audio device, such as an external speaker system, an external display device such as a display screen, or an input device (e.g., remote-control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some embodiments of the present disclosure, image processing apparatus 200 includes a computer-implemented artificial neural network (ANN) to generate classification data for a set of samples. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, the node processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

According to some embodiments, image processing apparatus 200 includes a computer-implemented convolutional neural network (CNN). A CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some embodiments, image processing apparatus 200 includes a transformer. A transformer or transformer network is a type of neural network model used for natural language processing tasks. A transformer network transforms one sequence into another sequence using an encoder and a decoder. The encoder and decoder include modules that can be stacked on top of each other multiple times. The modules comprise multi-head attention and feed forward layers. The inputs and outputs (target sentences) are first embedded into an n-dimensional space. Positional encoding of the different words (i.e., give every word/part in a sequence a relative position since the sequence depends on the order of its elements) are added to the embedded representation (n-dimensional vector) of each word. In some examples, a transformer network includes attention mechanism, where the attention looks at an input sequence and decides at each step which other parts of the sequence are important. The attention mechanism involves query, keys, and values denoted by Q, K, and V, respectively. Q is a matrix that contains the query (vector representation of one word in the sequence), K are all the keys (vector representations of all the words in the sequence) and V are the values, which are again the vector representations of all the words in the sequence. For the encoder and decoder, multi-head attention modules, V consists of the same word sequence than Q. However, for the attention module that is taking into account the encoder and the decoder sequences, V is different from the sequence represented by Q. In some cases, values in V are multiplied and summed with some attention-weights a.

According to some aspects, style encoder network 230 identifies a style image including a target style. In some examples, style encoder network 230 (e.g., trained based on a style loss) generates a style vector representing the target style based on the style image. According to some aspects, diffusion model 255 (e.g., trained independently of the style encoder network 230) generates a synthetic image based on the style vector, where the synthetic image includes the target style. In some aspects, the style vector represents the target style in a latent space for conditional guidance of the diffusion model 255. In some aspects, the style vector does not encode semantic content of the style image.

In some examples, diffusion model 255 receives a text prompt indicating content for the synthetic image. In some examples, diffusion model 255 generates at least one guidance vector based on the text prompt, where the style vector is in a same latent space as the at least one guidance vector, and where the synthetic image is generated to include the content based on the at least one guidance vector.

According to some aspects, layout encoder network 235 identifies a target layout for the synthetic image. In some examples, layout encoder network 235 generates a layout vector representing the target layout using a layout encoder network 235, where the synthetic image is generated based on the layout vector and is arranged according to the target layout.

According to some aspects, audio encoder network 240 identifies audio data indicating content for the synthetic image. In some examples, audio encoder network 240 generates an audio vector representing the audio data using an audio encoder network 240, where the synthetic image is generated based on the audio vector and includes the content from the audio data.

According to some aspects, depth encoder network 245 identifies depth information for the synthetic image. In some examples, depth encoder network 245 generates a depth vector representing the depth information using a depth encoder network 245, where the synthetic image is generated based on the depth vector and is arranged according to the depth information.

According to some aspects, training component 220 identifies a training image that includes a target style. According to some aspects, style encoder network 230 encodes the training image to obtain a style vector representing the target style in a latent space for guidance of a diffusion model 255. In some examples, training component 220 computes a style loss based on the training image and the style vector. In some examples, training component 220 trains the style encoder network 230 by updating parameters of the style encoder network 230 based on the style loss.

In some examples, training component 220 identifies a set of training images including the target style. In some examples, training component 220 computes an optimized style vector based on the set of training images. In some examples, training component 220 compares the style vector to the optimized style vector to obtain the style loss.

In some examples, training component 220 identifies an original image from the set of images and a prompt describing the original image. According to some aspects, diffusion model 255 generates a synthetic image based on the original image, the prompt, and the optimized style vector. In some examples, training component 220 compares the synthetic image to the original image. In some examples, training component 220 updates the optimized style vector based on the comparison.

According to some aspects, artistic style classifier network 250 computes an artistic style score for a set of candidate training images using an artistic style classifier network 250. In some examples, artistic style classifier network 250 selects the set of training images based on the artistic style score.

In some examples, training component 220 generates an original style representation of the training image. In some examples, diffusion model 255 generates a synthetic image based on the style vector. In some examples, training component 220 generates a predicted style representation of the synthetic image. In some examples, training component 220 compares the original style representation and the predicted style representation to obtain the style loss.

According to some aspects, audio encoder network 240 trains an audio encoder network 240 to generate an audio vector representing audio data in the training image, where the synthetic image is generated based on the audio vector.

According to some aspects, layout encoder network 235 trains a layout encoder network 235 to generate a layout vector representing layout information of the training image, where the synthetic image is generated based on the layout vector and is arranged according to the layout information.

According to some aspects, depth encoder network 245 trains a depth encoder network 245 to generate a depth vector representing depth information of the training image, where the synthetic image is generated based on the depth vector and is arranged according to the depth information.

Figure 3:
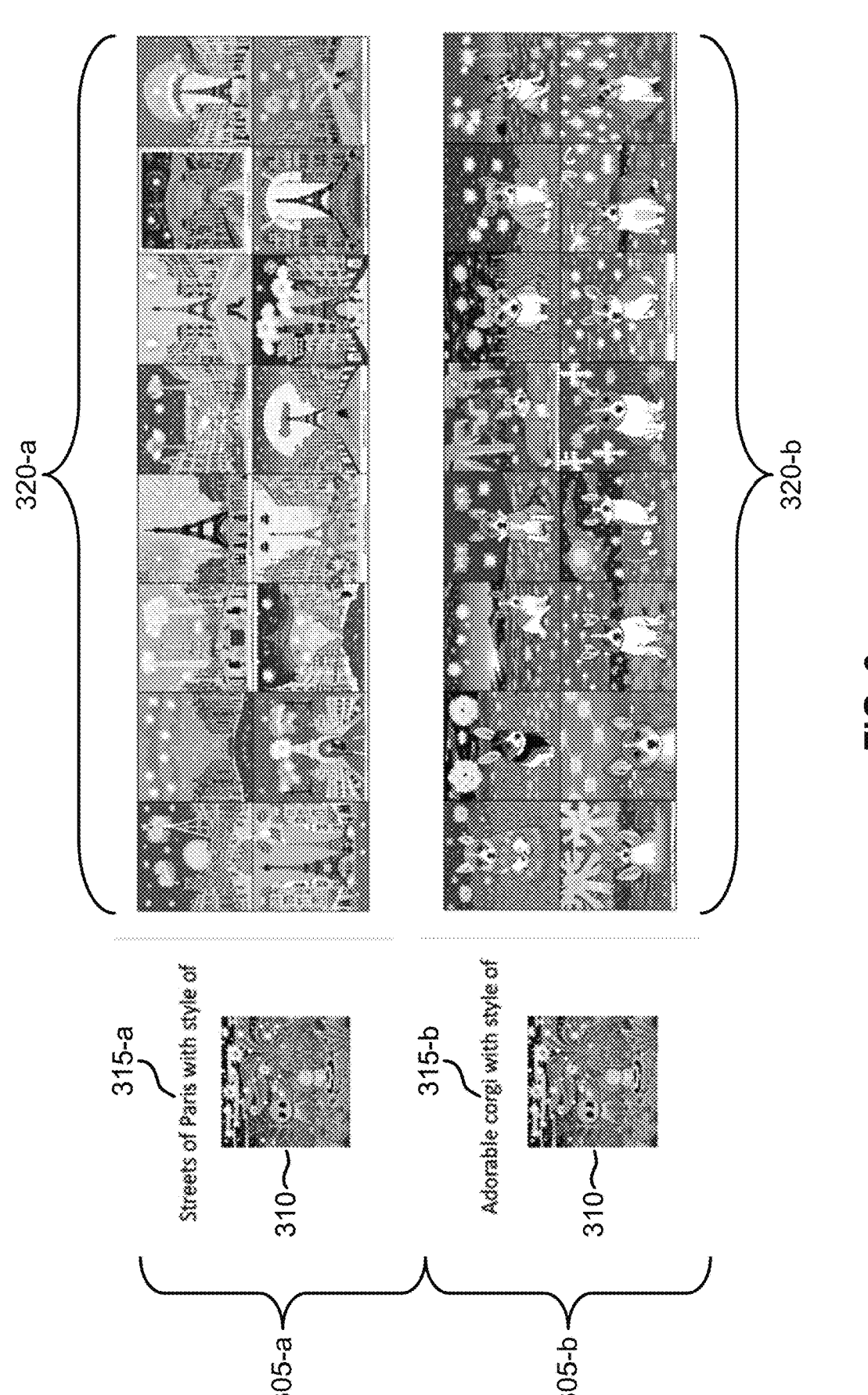
FIG. 3 shows an example of images generated by an image processing apparatus according to aspects of the present disclosure.

FIG. 3 shows examples of images generated by an image processing apparatus according to aspects of the present disclosure. In a first example 305-*a*, a style image 310 and a text prompt 315-*a* may be provided as input to the image processing apparatus, and the image processing apparatus may generate the images 320-*a* with a same or similar style as the style image 310. In a second example 305-*b*, a style image 310 and a text prompt 315-*b* may be provided to the image processing apparatus, and the image processing apparatus may generate the images 320-*b* with a same or similar style as the style image 310. For each example, the image processing apparatus may identify the style image 310 and may generate a style vector representing a same or similar style as the style image (e.g., a target style). The style vector may then be used to generate the images 320. The style image 310 and the text prompts 315 may be from a Behance project and the images may be generated using a pretrained diffusion model.

Figure 4:
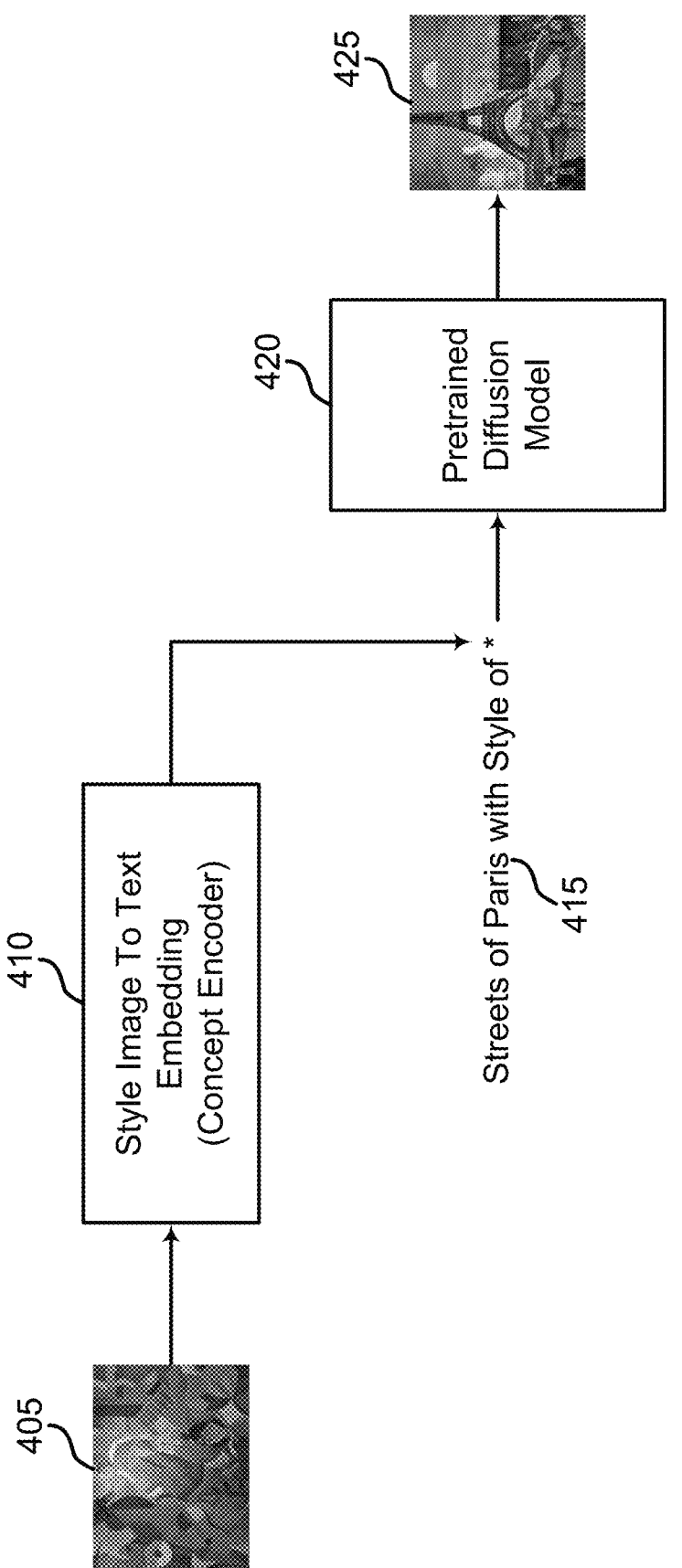
FIG. 4 shows an example of style encoding and image generation according to aspects of the present disclosure.

FIG. 4 shows an example of style encoding and image generation according to aspects of the present disclosure. Style encoding and image generation may be performed by an image processing apparatus which may be an example of, or include aspects of, the corresponding element described with reference to FIGS. 1 and 2. Although the example described with reference to FIG. 4 is related to style encoding, the described techniques may be used for other types of encoding (e.g., the same approach with the right dataset may be used to go beyond style). For example, an image processing apparatus may train encoders for other modalities like audio, segmentation mapping, depth information, etc.

Recently, large-scale text-to-image models have shown great performance for text-to-image generation. These models allow users to synthesize novel scenes with unseen compositions and produce vivid pictures in a myriad of styles. Their use, however, is constrained by a user's ability to describe a desired style through text. Some machine learning models (e.g., for textual inversion) may use an optimization method to determine a new word (e.g., embedding) in a textual embedding space of a pretrained text-to-image model based on multiple images that share a same style. For instance, a textual inversion method may allow for generating a new word in a textual embedding space to describe a style based on multiple images that share a same style. However, the optimization method may be very time consuming and may not be feasible for use in a product.

The systems, methods, and techniques described herein may allow for generating a new word in real time for representing a desired style based on a style image (e.g., allowing users to describe a desired style through an image). An image processing apparatus may train an encoder 410 (e.g., a feedforward encoder) that takes a style image 405 as input and produces a new word in a textual embedding space of a pretrained text-to-image model 420. The image processing apparatus may then use the new word (e.g., predicted word embedding) to generate new images. For example, the new word may be inserted into a text prompt 415 and provided as input to a pretrained diffusion model 420, and the pretrained diffusion model 420 may generate a synthetic image 425 with a same style or a similar style as the style image 405.

The encoder 410 may be trained based on a style loss to generate a style vector based on an input style image.

In some examples, training data may include paired data collected using a textual inversion method. The paired data may include pairs of images and optimized style vectors. During training, a training component may compare a style vector generated by the encoder 410 based on a training image to an optimized style vector for the training image to obtain a style loss, and the training component may train the encoder 410 based on the style loss. The training images in the training data may be from one or more Behance projects. A concept encoder (e.g., CLIP encoder) may be used to generate prompts describing the images. A style vector for a training image may be optimized by updating the style vector based on comparing the training image to a synthetic image generated using the training image, a prompt generated for the training image, and the style vector (e.g., a previous value of the style vector).

In some examples, training data may include training images. During training, a training component may generate an original style representation of a training image and a predicted style representation of a synthetic image. The synthetic image may be generated based on a style vector representing a target style of the training image. The training component may compare the original style representation and the predicted style representation to obtain a style loss, and the training component may train the encoder 410 based on the style loss.

Figure 5:
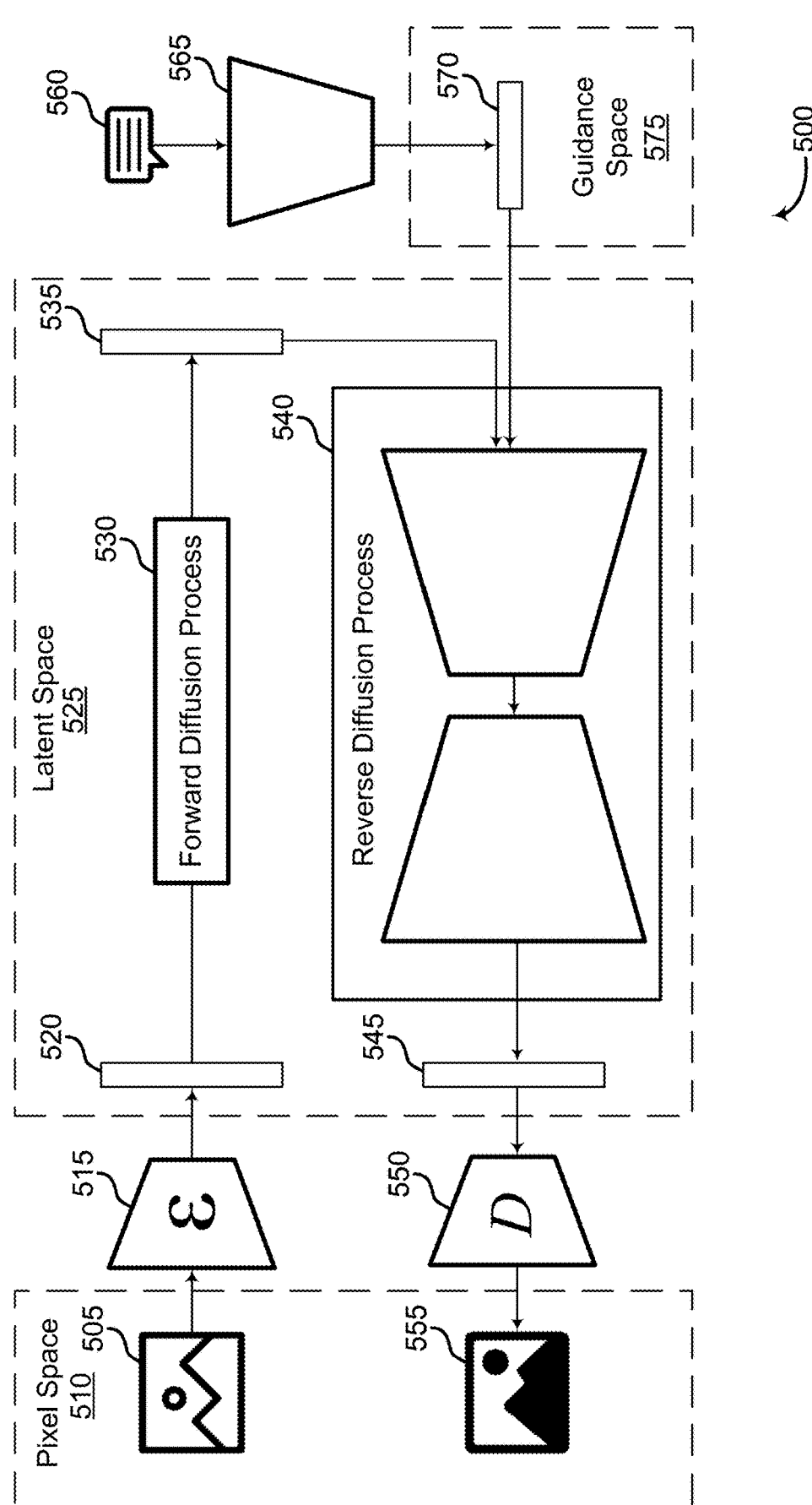
FIG. 5 shows an example of a guided latent diffusion model according to aspects of the present disclosure.

FIG. 5 shows an example of a guided latent diffusion model 500 according to aspects of the present disclosure. The guided latent diffusion model 500 depicted in FIG. 5 is an example of, or includes aspects of, the corresponding element described with reference to FIG. 2.

Diffusion models are a class of generative neural networks which can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance), image inpainting, and image manipulation.

Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (i.e., latent diffusion).

Diffusion models work by iteratively adding noise to the data during a forward process and then learning to recover the data by denoising the data during a reverse process. For example, during training, guided latent diffusion model 500 may take an original image 505 in a pixel space 510 as input and apply image encoder 515 to convert original image 505 into original image features 520 in a latent space 525. Then, a forward diffusion process 530 gradually adds noise to the original image features 520 to obtain noisy features 535 (also in latent space 525) at various noise levels.

Next, a reverse diffusion process 540 (e.g., a U-Net ANN) gradually removes the noise from the noisy features 535 at the various noise levels to obtain denoised image features 545 in latent space 525. In some examples, the denoised image features 545 are compared to the original image features 520 at each of the various noise levels, and parameters of the reverse diffusion process 540 of the diffusion model are updated based on the comparison. Finally, an image decoder 550 decodes the denoised image features 545 to obtain an output image 555 in pixel space 510. In some cases, an output image 555 is created at each of the various noise levels. The output image 555 can be compared to the original image 505 to train the reverse diffusion process 540.

In some cases, image encoder 515 and image decoder 550 are pre-trained prior to training the reverse diffusion process 540. In some examples, they are trained jointly, or the image encoder 515 and image decoder 550 are fine-tuned jointly with the reverse diffusion process 540.

The reverse diffusion process 540 can also be guided based on a text prompt 560, or another guidance prompt, such as an image, a layout, a segmentation map, etc. The text prompt 560 can be encoded using a text encoder 565 (e.g., a multimodal encoder) to obtain guidance features 570 in guidance space 575. The guidance features 570 can be combined with the noisy features 535 at one or more layers of the reverse diffusion process 540 to ensure that the output image 555 includes content described by the text prompt 560. For example, guidance features 570 can be combined with the noisy features 535 using a cross-attention block within the reverse diffusion process 540.

Image Processing

Figure 6:
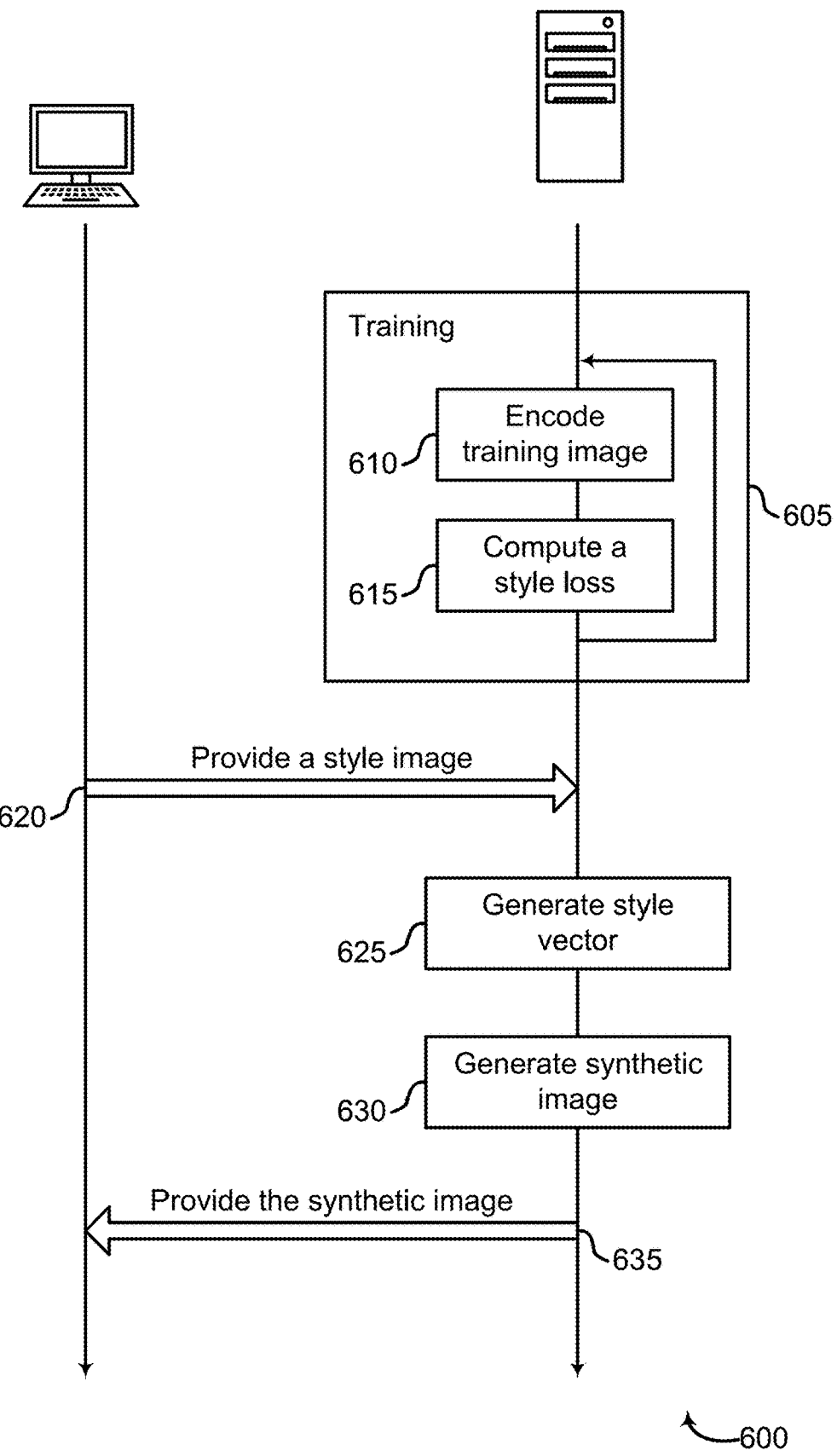
FIG. 6 shows an example of a method for image processing according to aspects of the present disclosure.

FIG. 6 shows an example of a method 600 for image processing according to aspects of the present disclosure. In some examples, the operations in method 600 are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, the system may train a style encoder to generate a style vector based on an input style image. During training, the system may iteratively perform operation 610 and operation 615 for each training image of a set of training images. At operation 610, the system may encode a training image to obtain a style vector, and, at operation 615, the system may compute a style loss based on the training image and the style vector. In some cases, the operations of this step refer to, or may be performed by, a training component described with reference to FIG. 2.

At operation 620, a user may provide a style image to the system to guide the system to generate a synthetic image having a same or similar style as the style image. In some examples, the user may also provide a text prompt to the system to further guide the system to generate the synthetic image. In some cases, the operations of this step refer to, or may be performed by, a computing device described with reference to FIG. 1.

At operation 625, the system may generate a style vector representing a style of the style image and a style of the synthetic image to be generated. The style vector may be referred to as an embedding in a latent space of a diffusion model and may be input to the diffusion model to generate the synthetic image. In some cases, the operations of this step refer to, or may be performed by, a style encoder network described with reference to FIG. 2.

At operation 630, the system may generate a synthetic image based on the style vector generated at 625. In some examples, if the user also provides a text prompt to the system, the system may generate the synthetic image based on the style vector and further based on the text prompt. In some cases, the operations of this step refer to, or may be performed by, a diffusion model described with reference to FIG. 2.

At operation 635, the system may provide the synthetic image to the user. In some cases, the operations of this step refer to, or may be performed by, an image processing apparatus described with reference to FIG. 2.

Although the example described with reference to FIG. 6 is related to generating a style vector and generating a synthetic image based on the style vector, the described systems, methods, or techniques may be used for generating other types of vectors and generating synthetic images based on these other types of vectors (e.g., in addition to, or as an alternative to, the style vector). In some examples, the image processing apparatus may generate a layout vector based on an input image to guide a diffusion model to generate a synthetic image that is arranged according to a target layout. In some examples, the image processing apparatus may generate an audio vector based on input audio data to guide a diffusion model to generate a synthetic image that includes content from the audio data. In some examples, the image processing apparatus may generate a depth vector based on input depth information to guide a diffusion model to generate a synthetic image that is arranged according to the depth information.

FIG. 7 shows an example of a method 700 for machine learning according to aspects of the present disclosure. In some examples, the operations in method 700 are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system identifies a style image including a target style. In some cases, the operations of this step refer to, or may be performed by, a style encoder network as described with reference to FIG. 2.

At operation 710, the system generates a style vector representing the target style based on the style image using a style encoder network trained based on a style loss. In some cases, the operations of this step refer to, or may be performed by, a style encoder network as described with reference to FIG. 2.

At operation 715, the system generates a synthetic image based on the style vector using a diffusion model trained independently of the style encoder network, where the synthetic image includes the target style. In some cases, the operations of this step refer to, or may be performed by, a diffusion model as described with reference to FIG. 2.

Figure 8:
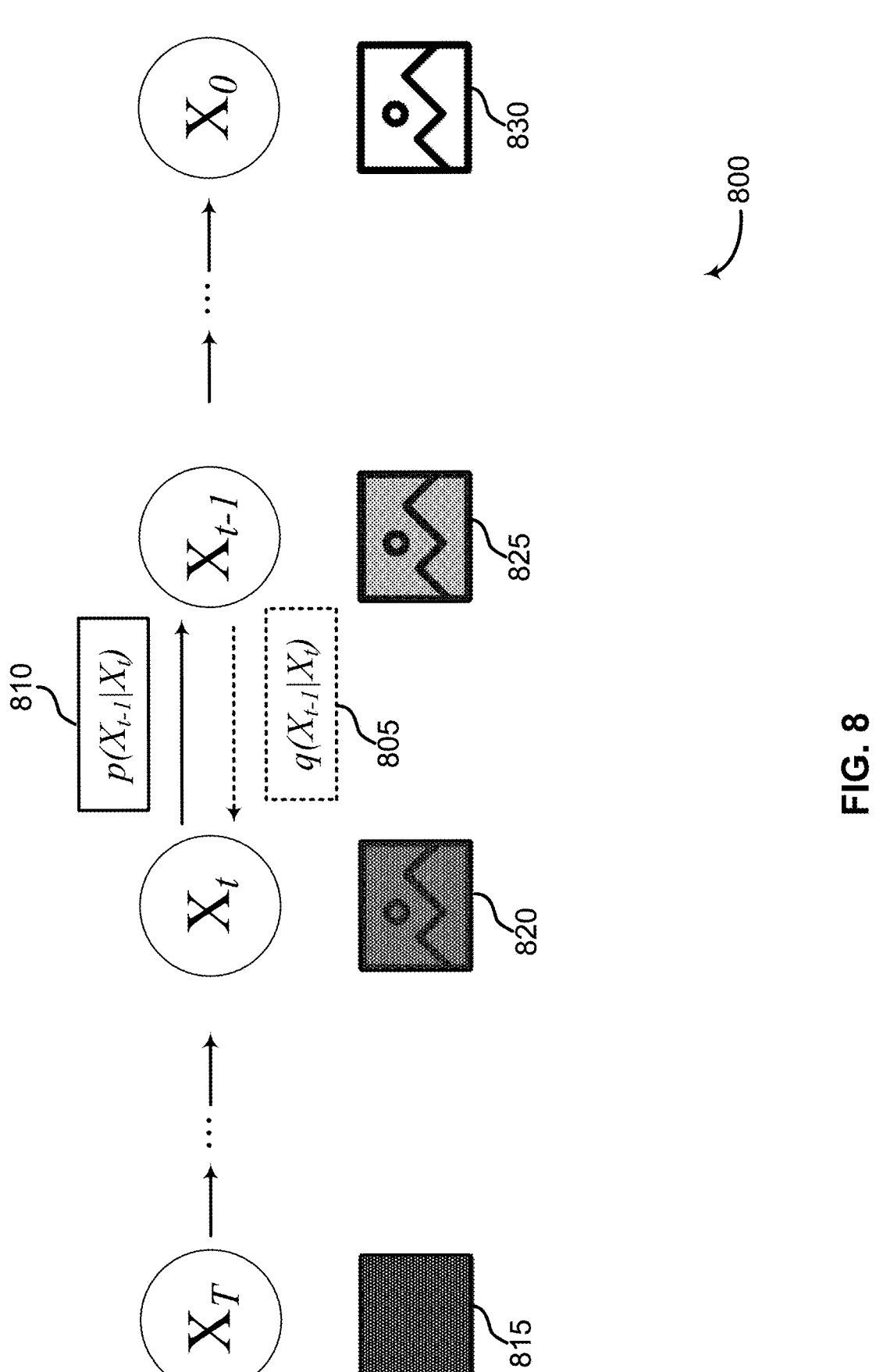
FIG. 8 shows a diffusion process according to aspects of the present disclosure.

FIG. 8 shows a diffusion process according to aspects of the present disclosure. As described with reference to FIG. 5, a diffusion model can include both a forward diffusion process 805 for adding noise to an image (or features in a latent space) and a reverse diffusion process 810 for denoising the images (or features) to obtain a denoised image. The forward diffusion process 805 can be represented as $q(x_t|x_{t-1})$, and the reverse diffusion process 810 can be represented as $p(x_{t-1}|x_t)$. In some cases, the forward diffusion process 805 is used during training to generate images with successively greater noise, and a neural network is trained to perform the reverse diffusion process 810 (i.e., to successively remove the noise).

In an example forward process for a latent diffusion model, the model maps an observed variable $x_0$ (either in a pixel space or a latent space) intermediate variables $x_1, \ldots, x_T$ using a Markov chain. The Markov chain gradually adds Gaussian noise to the data to obtain the approximate posterior $q(x_{1:T}|x_0)$ as the latent variables are passed through a neural network such as a U-Net, where $x_1, \ldots, x_T$ have the same dimensionality as $x_0$.

The neural network may be trained to perform the reverse process. During the reverse diffusion process 810, the model begins with noisy data $x_T$, such as a noisy image 815 and denoises the data to obtain the $p(x_{t-1}|x_t)$. At each step t−1, the reverse diffusion process 810 takes $x_t$, such as first intermediate image 820, and t as input. Here, t represents a step in the sequence of transitions associated with different noise levels. The reverse diffusion process 810 outputs $x_{t-1}$, such as second intermediate image 825 iteratively until $x_T$ is reverted back to $x_0$, the original image 830. The reverse process can be represented as:

$$p_\theta(x_{t-1}|x_t) := N(x_{t-1}; \mu_\theta(x_t,t), \mu_\theta(x_t,t)). \tag{1}$$

The joint probability of a sequence of samples in the Markov chain can be written as a product of conditionals and the marginal probability:

$$x_T \cdot p_\theta(x_{0:T}) := p(x_T) \Pi_{t=1}^T p_\theta(x_{t-1}|x_t), \tag{2}$$

where $p(x_T) = N(x_T; 0, I)$ is the pure noise distribution as the reverse process takes the outcome of the forward process, a sample of pure noise, as input and $\Pi_{t=1}^T p_\theta(x_{t-1}|x_t)$ represents a sequence of Gaussian transitions corresponding to a sequence of addition of Gaussian noise to the sample.

At interference time, observed data $x_0$ in a pixel space can be mapped into a latent space as input and a generated data $\tilde{x}$ is mapped back into the pixel space from the latent space as output. In some examples, $x_0$ represents an original input image with low image quality, latent variables $x_1, \ldots, x_T$ represent noisy images, and $\tilde{x}$ represents the generated image with high image quality.

Training

FIG. 9 shows an example of a method 900 for machine learning according to aspects of the present disclosure. In some examples, the operations in method 900 are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system identifies a training image that includes a target style. In some cases, the operations of this step refer to, or may be performed by, a training component as described with reference to FIG. 2.

At operation 910, the system encodes the training image using a style encoder network to obtain a style vector representing the target style in a latent space for guidance of a diffusion model. In some cases, the operations of this step refer to, or may be performed by, a style encoder network as described with reference to FIG. 2.

At operation 915, the system computes a style loss based on the training image and the style vector. In some cases, the operations of this step refer to, or may be performed by, a training component as described with reference to FIG. 2.

At operation 920, the system trains the style encoder network by updating parameters of the style encoder network based on the style loss. In some cases, the operations of this step refer to, or may be performed by, a training component as described with reference to FIG. 2.

Figure 10:
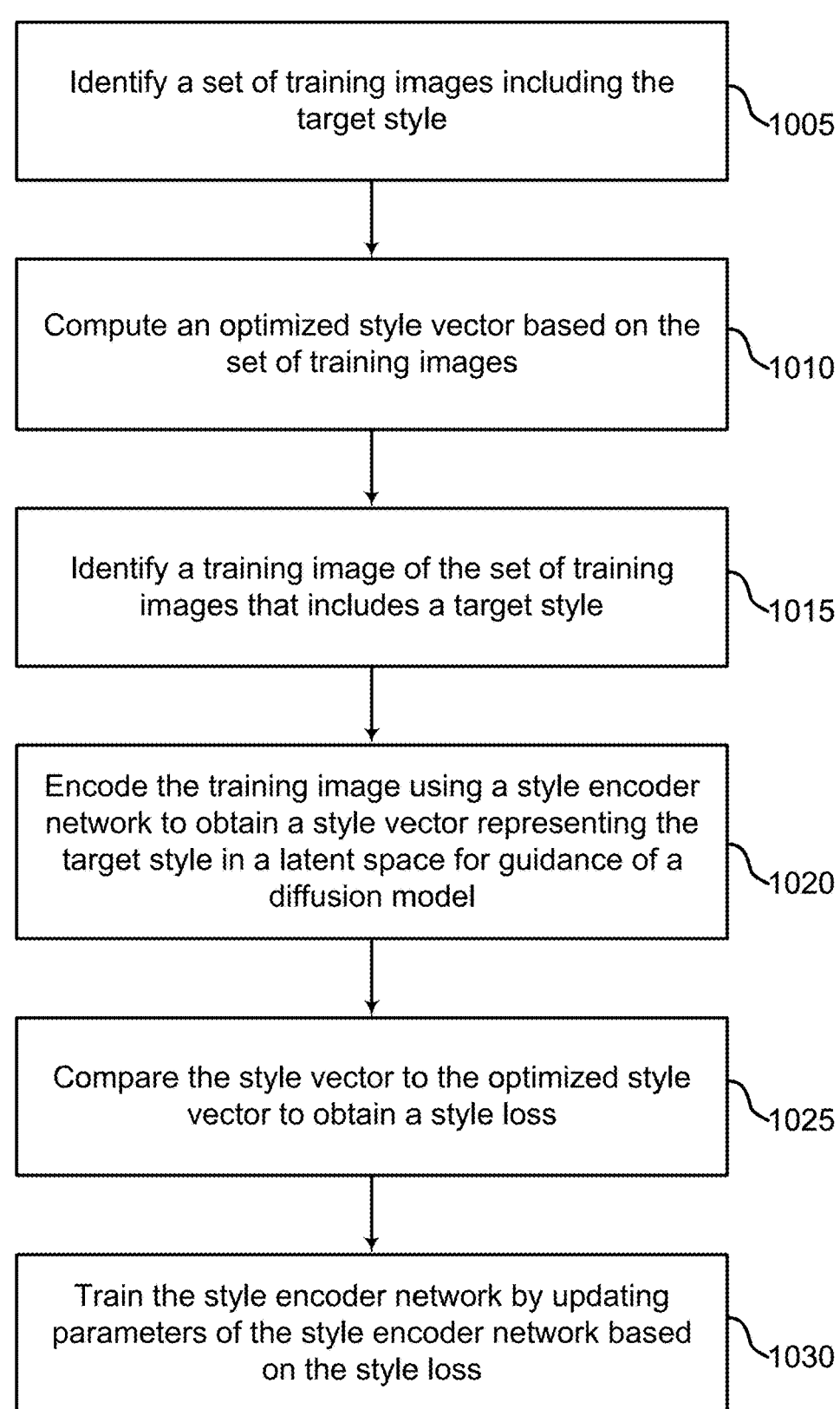

FIG. 10 shows an example of a method 1000 for machine learning according to aspects of the present disclosure. In some examples, the operations in method 1000 are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the system identifies a set of training images including the target style. In some cases, the operations of this step refer to, or may be performed by, a training component as described with reference to FIG. 2.

At operation 1010, the system computes an optimized style vector based on the set of training images. In some cases, the operations of this step refer to, or may be performed by, a training component as described with reference to FIG. 2.

At operation 1015, the system identifies a training image of the set of training images that includes a target style. In some cases, the operations of this step refer to, or may be performed by, a training component as described with reference to FIG. 2.

At operation 1020, the system encodes the training image using a style encoder network to obtain a style vector representing the target style in a latent space for guidance of a diffusion model. In some cases, the operations of this step refer to, or may be performed by, a style encoder network as described with reference to FIG. 2.

At operation 1025, the system compares the style vector to the optimized style vector to obtain a style loss. In some cases, the operations of this step refer to, or may be performed by, a training component as described with reference to FIG. 2.

At operation 1030, the system trains the style encoder network by updating parameters of the style encoder network based on the style loss. In some cases, the operations of this step refer to, or may be performed by, a training component as described with reference to FIG. 2.

FIG. 11 shows an example of a method 1100 for machine learning according to aspects of the present disclosure. In some examples, the operations in method 1100 are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system identifies a training image that includes a target style. In some cases, the operations of this step refer to, or may be performed by, a training component as described with reference to FIG. 2.

At operation 1110, the system generates an original style representation of the training image. In some cases, the operations of this step refer to, or may be performed by, a training component as described with reference to FIG. 2.

At operation 1115, the system encodes the training image using a style encoder network to obtain a style vector representing the target style in a latent space for guidance of a diffusion model. In some cases, the operations of this step refer to, or may be performed by, a style encoder network as described with reference to FIG. 2.

At operation 1120, the system generates a synthetic image based on the style vector using a diffusion network. In some cases, the operations of this step refer to, or may be performed by, a diffusion model as described with reference to FIG. 2.

At operation 1125, the system generates a predicted style representation of the synthetic image. In some cases, the operations of this step refer to, or may be performed by, a training component as described with reference to FIG. 2.

At operation 1130, the system compares the original style representation and the predicted style representation to obtain a style loss. In some cases, the operations of this step refer to, or may be performed by, a training component as described with reference to FIG. 2.

At operation 1135, the system trains the style encoder network by updating parameters of the style encoder network based on the style loss. In some cases, the operations of this step refer to, or may be performed by, a training component as described with reference to FIG. 2.

Figure 12:
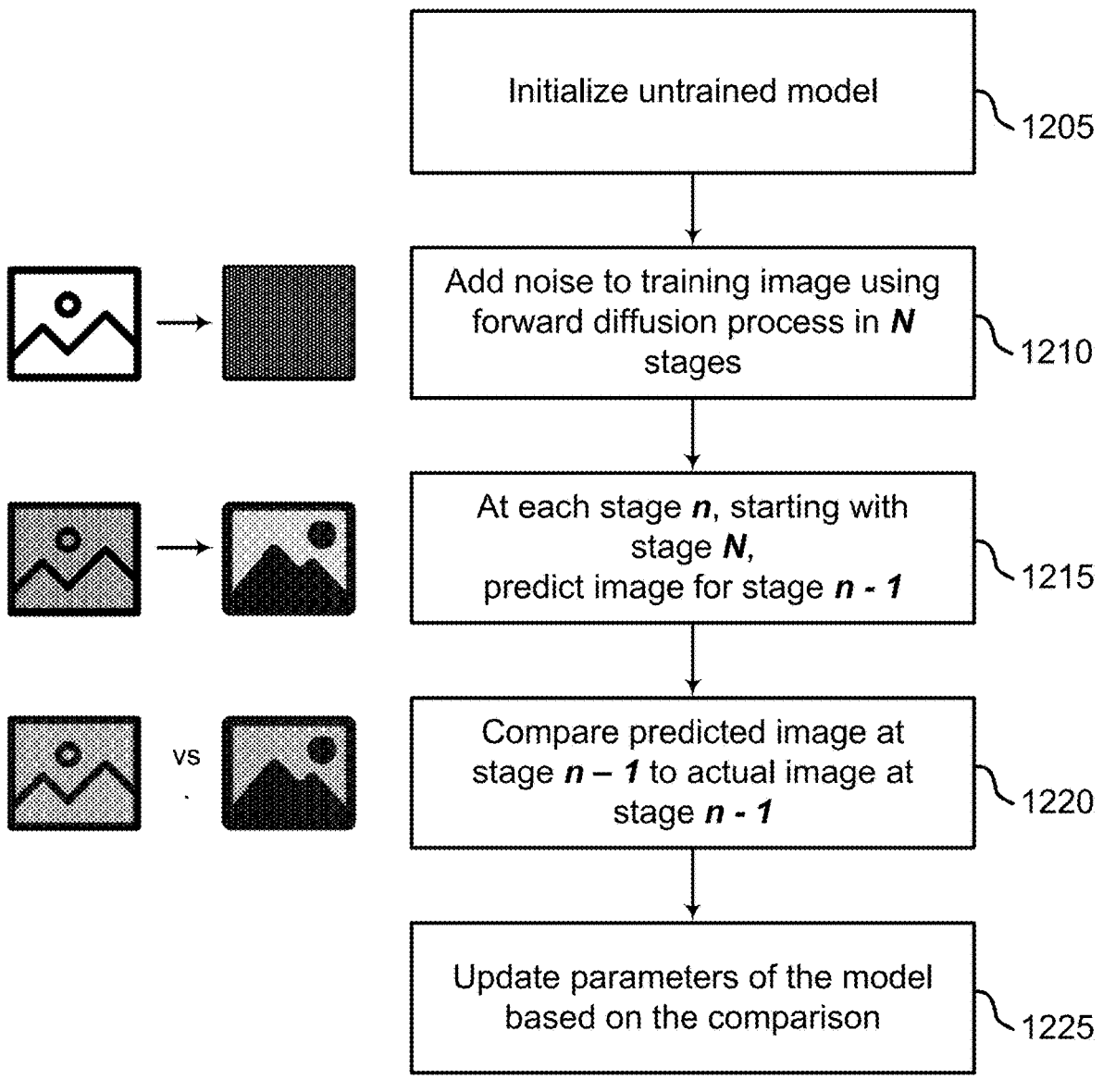
FIG. 12 shows an example of a method for training a diffusion model according to aspects of the present disclosure.

FIG. 12 shows an example of a method 1200 for training a diffusion model according to aspects of the present disclosure. The method 1200 represents an example for training a reverse diffusion process as described above with reference to FIG. 8. In some examples, these operations are performed by a system including a processor executing a set of codes to control functional elements of an apparatus, such as the apparatus described in FIG. 2.

Additionally, or alternatively, certain processes of method 1200 may be performed using special-purpose hardware. Generally, these operations are performed according to the methods and processes described in accordance with aspects of the present disclosure. In some cases, the operations described herein are composed of various substeps, or are performed in conjunction with other operations.

At operation 1205, the user initializes an untrained model. Initialization can include defining the architecture of the model and establishing initial values for the model parameters. In some cases, the initialization can include defining hyper-parameters such as the number of layers, the resolution and channels of each layer blocks, the location of skip connections, and the like.

At operation 1210, the system adds noise to a training image using a forward diffusion process in N stages. In some cases, the forward diffusion process is a fixed process where Gaussian noise is successively added to an image. In latent diffusion models, the Gaussian noise may be successively added to features in a latent space.

At operation 1215, the system at each stage n, starting with stage N, a reverse diffusion process is used to predict the image or image features at stage n−1. For example, the reverse diffusion process can predict the noise that was added by the forward diffusion process, and the predicted noise can be removed from the image to obtain the predicted image. In some cases, an original image is predicted at each stage of the training process.

At operation 1220, the system compares predicted image (or image features) at stage n−1 to an actual image (or image features), such as the image at stage n−1 or the original input image. For example, given observed data x, the diffusion model may be trained to minimize the variational upper bound of the negative log-likelihood $-\log p_\theta(x)$ of the training data.

At operation 1225, the system updates parameters of the model based on the comparison. For example, parameters of a U-Net may be updated using gradient descent. Time-dependent parameters of the Gaussian transitions can also be learned.

FIG. 13 shows an example of a computing device for image processing according to aspects of the present disclosure. In one aspect, computing device 1300 includes processor(s) 1305, memory subsystem 1310, communication interface 1315, I/O interface 1320, user interface component(s) 1325, and channel 1330.

In some embodiments, computing device 1300 is an example of, or includes aspects of, image processing apparatus 200 of FIG. 2. In some embodiments, computing device 1300 includes one or more processors 1305 that can execute instructions stored in memory subsystem 1310 for identifying a region of an image containing text; identifying a color of the text; and generating a modified image using a diffusion model based on the color of the text, wherein the modified image has a background color in the region of the image that contrasts with the color of the text.

According to some aspects, computing device 1300 includes one or more processors 1305. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 1310 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1315 operates at a boundary between communicating entities (such as computing device 1300, one or more user devices, a cloud, and one or more databases) and channel 1330 and can record and process communications. In some cases, communication interface 1315 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1320 is controlled by an I/O controller to manage input and output signals for computing device 1300. In some cases, I/O interface 1320 manages peripherals not integrated into computing device 1300. In some cases, I/O interface 1320 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1320 or via hardware components controlled by the I/O controller.

According to some aspects, user interface component(s) 1325 enable a user to interact with computing device 1300. In some cases, user interface component(s) 1325 include an audio device, such as an external speaker system, an external display device such as a display screen, an input device (e.g., a remote-control device interfaced with a user interface directly or through the I/O controller), or a combination thereof. In some cases, user interface component(s) 1325 include a GUI.

Accordingly, the present disclosure includes the following aspects.

A method for machine learning for image processing is described. One or more aspects of the method include identifying a style image including a target style; generating a style vector representing the target style based on the style image using a style encoder network trained based on a style loss; and generating a synthetic image based on the style vector using a diffusion model trained independently of the style encoder network, wherein the synthetic image includes the target style.

In some aspects, the style vector represents the target style in a latent space for conditional guidance of the diffusion model.

In some aspects, the style vector does not encode semantic content of the style image.

Some examples of the method, apparatus, non-transitory computer readable medium, and system further include receiving a text prompt indicating content for the synthetic image. Some examples further include generating at least one guidance vector based on the text prompt, wherein the style vector is in a same latent space as the at least one guidance vector, and wherein the synthetic image is generated to include the content based on the at least one guidance vector.

Some examples of the method, apparatus, non-transitory computer readable medium, and system further include identifying a target layout for the synthetic image. Some examples further include generating a layout vector representing the target layout using a layout encoder network, wherein the synthetic image is generated based on the layout vector and is arranged according to the target layout.

Some examples of the method, apparatus, non-transitory computer readable medium, and system further include identifying audio data indicating content for the synthetic image. Some examples further include generating an audio vector representing the audio data using an audio encoder network, wherein the synthetic image is generated based on the audio vector and includes the content from the audio data.

Some examples of the method, apparatus, non-transitory computer readable medium, and system further include identifying depth information for the synthetic image. Some examples further include generating a depth vector representing the depth information using a depth encoder network, wherein the synthetic image is generated based on the depth vector and is arranged according to the depth information.

A method for machine learning for image processing is described. One or more aspects of the method include identifying a training image that includes a target style; encoding the training image using a style encoder network to obtain a style vector representing the target style in a latent space for guidance of a diffusion model; computing a style loss based on the training image and the style vector; and training the style encoder network by updating parameters of the style encoder network based on the style loss.

Some examples of the method, apparatus, non-transitory computer readable medium, and system further include identifying a plurality of training images including the target style. Some examples further include computing an optimized style vector based on the plurality of training images. Some examples further include comparing the style vector to the optimized style vector to obtain the style loss.

Some examples of the method, apparatus, non-transitory computer readable medium, and system further include identifying an original image from the plurality of images and a prompt describing the original image. Some examples further include generating a synthetic image based on the original image, the prompt, and the optimized style vector. Some examples further include comparing the synthetic image to the original image. Some examples further include updating the optimized style vector based on the comparison.

Some examples of the method, apparatus, non-transitory computer readable medium, and system further include computing an artistic style score for a plurality of candidate training images using an artistic style classifier network. Some examples further include selecting the plurality of training images based on the artistic style score.

Some examples of the method, apparatus, non-transitory computer readable medium, and system further include generating an original style representation of the training image. Some examples further include generating a synthetic image based on the style vector using a diffusion network. Some examples further include generating a predicted style representation of the synthetic image. Some examples further include comparing the original style representation and the predicted style representation to obtain the style loss.

Some examples of the method, apparatus, non-transitory computer readable medium, and system further include training an audio encoder network to generate an audio vector representing audio data in the training image, wherein the synthetic image is generated based on the audio vector.

Some examples of the method, apparatus, non-transitory computer readable medium, and system further include training a layout encoder network to generate a layout vector representing layout information of the training image, wherein the synthetic image is generated based on the layout vector and is arranged according to the layout information.

Some examples of the method, apparatus, non-transitory computer readable medium, and system further include training a depth encoder network to generate a depth vector representing depth information of the training image, wherein the synthetic image is generated based on the depth vector and is arranged according to the depth information.

An apparatus for machine learning for image processing is described. One or more aspects of the apparatus include a processor; a memory including instructions executable by the processor to: identify a style image including a target style; generate a style vector representing the target style based on the style image using a style encoder network trained based on a style loss; and generate a synthetic image based on the style vector using a diffusion model trained independently of the style encoder network, wherein the synthetic image includes the target style.

In some aspects, the instructions are further executable to generate a layout vector representing a target layout using a layout encoder network, wherein the synthetic image is generated based on the layout vector and is arranged according to the target layout.

In some aspects, the instructions are further executable to generate an audio vector representing audio data using an audio encoder network, wherein the synthetic image is generated based on the audio vector and includes the content from the audio data.

In some aspects, the instructions are further executable to generate a depth vector representing depth information using a depth encoder network, wherein the synthetic image is generated based on the depth vector and is arranged according to the depth information.

In some aspects, the instructions are further executable to compute an artistic style score for candidate training images using an artistic style classifier network.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
identifying a style image and a text prompt, wherein the style image indicates a target style and the text prompt indicates image content;
generating a style vector representing the target style based on the style image using a style encoder network;

generating a guidance embedding by inserting the style vector corresponding to the style image into an embedding of the text prompt in place of a part of the text prompt, wherein the guidance embedding represents the target style from the style image in an embedding space for guidance of a diffusion model; and
generating, using the diffusion model, a synthetic image by denoising noisy image features based on the guidance embedding using the diffusion model, wherein the synthetic image depicts the image content from the text prompt with the target style from the style image.

2. The method of claim 1, wherein:
the style vector represents the target style in the embedding space for conditional guidance of the diffusion model.

3. The method of claim 1, wherein:
the style vector does not encode semantic content of the style image.

4. The method of claim 1, further comprising:
generating at least one guidance vector based on the text prompt, wherein the style vector is in a same latent space as the at least one guidance vector, and wherein the synthetic image is generated to include the content based on the at least one guidance vector.

5. The method of claim 1, further comprising:
identifying a target layout for the synthetic image; and
generating a layout vector representing the target layout using a layout encoder network, wherein the synthetic image is generated based on the layout vector and is arranged according to the target layout.

6. The method of claim 1, further comprising:
identifying audio data indicating content for the synthetic image; and
generating an audio vector representing the audio data using an audio encoder network, wherein the synthetic image is generated based on the audio vector and includes the content from the audio data.

7. The method of claim 1, further comprising:
identifying depth information for the synthetic image; and
generating a depth vector representing the depth information using a depth encoder network, wherein the synthetic image is generated based on the depth vector and is arranged according to the depth information.

8. A method comprising:
identifying a plurality of training images including a target style;
computing an optimized style vector based on the plurality of training images;
identifying a training image that includes the target style;
encoding the training image using a style encoder network to obtain a style vector representing the target style in a latent space for guidance of a diffusion model, wherein the style vector represents the target style from the training image in an embedding space for guidance of the diffusion model;
computing a style loss based on the training image by comparing the style vector to the optimized style vector;
training the style encoder network by updating parameters of the style encoder network based on the style loss; and
inserting an output of the trained style encoder network into an embedding of a text prompt in place of a part of the text prompt to obtain a guidance embedding for the diffusion model.

9. The method of claim 8, further comprising:

identifying an original image from the plurality of images and a prompt describing the original image;

generating a synthetic image based on the original image, the prompt, and the optimized style vector;

comparing the synthetic image to the original image; and updating the optimized style vector based on the comparison.

10. The method of claim 8, further comprising:

computing an artistic style score for a plurality of candidate training images using an artistic style classifier network; and selecting the plurality of training images based on the artistic style score.

11. The method of claim 8, further comprising:

generating an original style representation of the training image;

generating a synthetic image based on the style vector using a diffusion network;

generating a predicted style representation of the synthetic image; and comparing the original style representation and the predicted style representation to obtain the style loss.

12. The method of claim 8, further comprising:

training an audio encoder network to generate an audio vector representing audio data in the training image, wherein the synthetic image is generated based on the audio vector.

13. The method of claim 8, further comprising:

training a layout encoder network to generate a layout vector representing layout information of the training image, wherein the synthetic image is generated based on the layout vector and is arranged according to the layout information.

14. The method of claim 8, further comprising:

training a depth encoder network to generate a depth vector representing depth information of the training image, wherein the synthetic image is generated based on the depth vector and is arranged according to the depth information.

15. An apparatus comprising:

a processor; and a memory including instructions executable by the processor to:

identify a style image and a text prompt, wherein the style image indicates a target style and the text prompt indicates image content;

generate a style vector representing the target style based on the style image using a style encoder network;

generate a guidance embedding by inserting the style vector corresponding to the style image into an embedding of the text prompt in place of a part of the text prompt, wherein the guidance embedding represents the target style from the style image in an embedding space for guidance of a diffusion model; and generate, using the diffusion model, a synthetic image by denoising noisy image features based on the guidance embedding using a diffusion model, wherein the synthetic image depicts the image content from the text prompt with the target style from the style image.

16. The apparatus of claim 15, the instructions further executable to:

generate a layout vector representing a target layout using a layout encoder network, wherein the synthetic image is generated based on the layout vector and is arranged according to the target layout.

17. The method apparatus of claim 15, the instructions further executable to:

generate an audio vector representing audio data using an audio encoder network, wherein the synthetic image is generated based on the audio vector and includes the content from the audio data.

18. The apparatus of claim 15, the instructions further executable to:

generate a depth vector representing depth information using a depth encoder network, wherein the synthetic image is generated based on the depth vector and is arranged according to the depth information.

19. The apparatus of claim 15, the instructions further executable to:

compute an artistic style score for candidate training images using an artistic style classifier network.

* * * * *